United States Patent [19]
Hopkins et al.

[11] 3,752,309
[45] Aug. 14, 1973

[54] SHEATH PACKAGE WITH SHEATH REMOVAL SIGNALLING FOR CLINICAL TEMPERATURE MEASUREMENT INSTRUMENT

[75] Inventors: Gene Hopkins, Tulsa, Okla.; Raymond F. Mohrman, St. Louis, Mo.

[73] Assignee: LaBarge, Inc., St. Louis, Mo.

[22] Filed: Nov. 3, 1971

[21] Appl. No.: 195,242

[52] U.S. Cl. ............................. 206/63.2, 206/16.5
[51] Int. Cl. ...................... A61b 19/02, B65d 85/00
[58] Field of Search ...................... 206/63.2 R, 16.5

[56] References Cited
UNITED STATES PATENTS

| | | | |
|---|---|---|---|
| 3,215,265 | 11/1965 | Welin-Berger | 206/63.2 R |
| 2,313,512 | 3/1943 | Brewer | 206/63.2 R |
| 3,143,280 | 8/1964 | Hiersteiner | 229/85 |
| 2,750,033 | 6/1956 | Pickens | 206/63.2 R |
| 2,902,146 | 9/1959 | Doherty | 206/63.2 R |

*Primary Examiner*—Leonard Summer
*Attorney*—Peter S. Gilster et al.

[57] ABSTRACT

A sheath package for use with a clinical temperature measurement probe. An elongate sheath has a mouth at one end for receiving the probe and is normally enclosed by a cover, the sheath extending into a mouth at one end of the cover such that the probe may be inserted in the sheath while the latter is in the cover and then withdrawn with the sheath thereon. A signal means has a normally concealed position when the sheath is in the cover before being withdrawn and is moved to a position in which it is visible when the probe with the sheath thereon is reinserted in the cover.

9 Claims, 5 Drawing Figures

SHEATH PACKAGE WITH SHEATH REMOVAL SIGNALLING FOR CLINICAL TEMPERATURE MEASUREMENT INSTRUMENT

BACKGROUND OF THE INVENTION

This invention relates to disposable sheaths for temperature measurement instruments or probes or the like and more particularly to a sheath package having a sheath removable from a cover and signalling reinsertion of the sheath into the cover following removal thereof.

It has heretofore been proposed to provide elongate disposable sanitary sheaths of thin, flexible material for use on clinical temperature measurement probes or mercury-bulb clinical thermometers. Such sheaths reduce time-consuming instrument sterilization costs and problems and substantially eliminate cross-contamination or patient reinfection in hospitals or in other clinical use. A sheath package having a disposable sheath of this type is disclosed in Welin-Berger U.S. Pat. No. 3,215,265.

A problem attendant in the use of disposable sheaths has involved their disposal after use. While it is expedient merely to discard the used sheath in the nearest waste disposal, this practice is subject to criticism as inconsistent with maintaining, insofar as is practical, an aseptic hospital or clinical environment and as conducive to the spread of disease-producing bacteria and viruses throughout the environment of use, such as of the so-called staph type. Rather than simply discarding the sheath on the spot, it has been proposed to return the used sheath to a cover from which it was previously removed and to thereafter sanitarily dispose of the cover with its used sheath. However, this presents the possibility that, through error, someone may later reuse the sheath. The present invention substantially precludes this possibility.

SUMMARY OF THE INVENTION

Among the several objects of the invention may be noted the provision of an improved sheath package of the type having an elongate flexible sheath enclosed by and removable for use from a cover; the provision of such a sheath package which provides signalling upon reinsertion of the sheath into the cover following removal for use of the sheath; the provision of such a sheath package wherein such signalling causes the appearance of the used sheath package to be conspicuously different from an unused package; the provision of such a sheath package which can be safely handled and sanitarily disposed of following use; and the provision of such a sheath package which is very simply and economically manufactured. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 3:
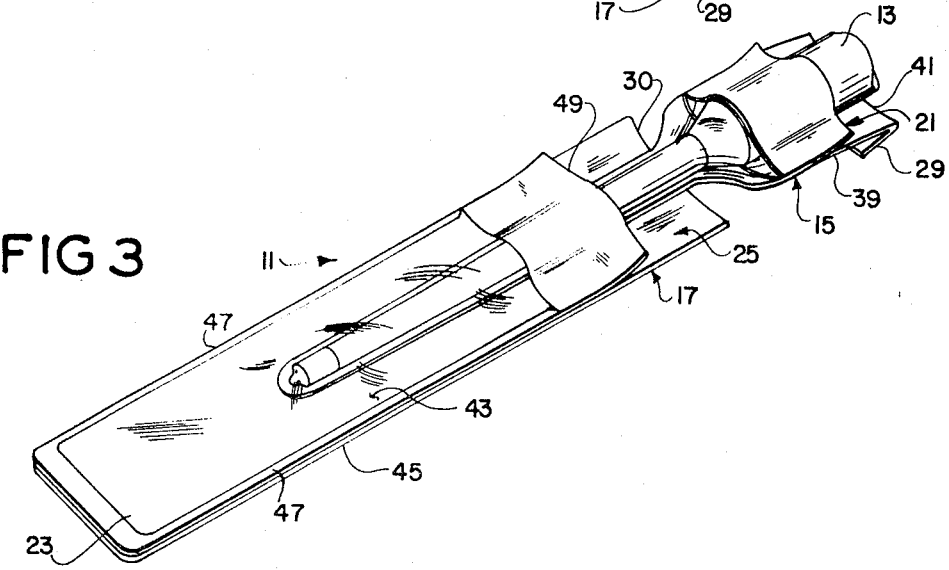
FIG. 3 is a perspective view of the package showing removal or reinsertion of the sheath with respect to the cover with the sheath on a temperature measurement probe.

Referring now to the drawings, an improved sheath package of the invention is generally designated 11. The package is particularly advantageous for use with a clinical temperature measurement device including an elongate probe. A portion of such a probe is seen in FIG. 3 at 13. However, the package is similarly useful with conventional clinical mercury-bulb thermometers as well as other elongate clinical instruments.

Figure 1:
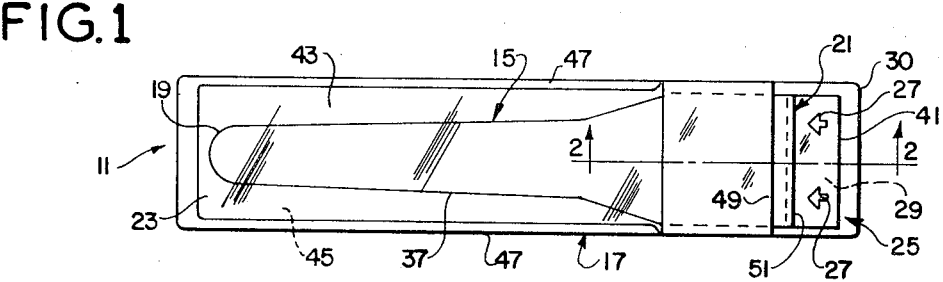
FIG. 1 is a plan view of the improved sheath package including a cover and a sheath enclosed by the cover prior to use.

The package 11 as assembled prior to use is shown in FIG. 1 and includes an elongate, flexible sheath generally indicated 15 and a generally rectangular, elongate cover generally indicated 17 normally substantially enclosing the sheath. Sheath 15 includes a narrow closed end or tip portion 19 and a somewhat wider mouth 21 at the opposite end adapted to receive the probe 13 so that the tip of the probe will be at the closed end or tip 19 of the sheath as shown in FIG. 3.

Similarly, cover 17 includes a closed end 23 and an opposite open end or mouth 25, sheath 15 extending into cover 17 from its mouth 25 with the mouth 21 of the sheath at the mouth 25 of the cover. The arrangement is such that the probe 13 may be inserted in sheath 15 while the sheath is so enclosed by the cover. Arrows 27 printed on the sheath serve to instruct the user to so insert the probe into the sheath mouth 21.

When probe 13 has thus been inserted into sheath 15 while the latter is in the cover, the probe may then be withdrawn from the cover through the mouth 25 thereof with sheath 15 on the probe. As will be understood, probe 13 with sheath 15 thereon is then inserted into a body cavity for measurement of body temperature.

Following temperature measurement, sheath 15 is not simply removed from the probe and discarded but instead is reinserted in cover 17. FIG. 3 is illustrative of both partial withdrawal and reinsertion of the probe with the cover thereon. When the sheath is so reinserted, pressure between the thumb and forefinger applied to the opposite walls of cover 17 at the tip 19 of sheath 15 will cause the used sheath to be retained in the cover as the probe is withdrawn.

Figure 2:
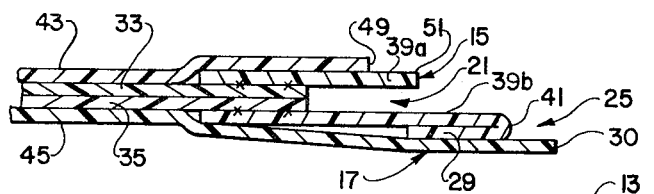
FIG. 2 is a partial cross-section of the package taken along line 2—2 of FIG. 1, thicknesses being greatly exaggerated.

In accordance with this invention, sheath 15 includes a tab 29 constituting signal means which normally occupies a concealed position (FIGS. 1 and 2) in which it is folded back within mouth 25 of cover 17 when the sheath is in the cover. Tab 29 is preferably unfolded by the fingers of the user as the probe with the sheath thereon is withdrawn from the cover. However, whether or not so unfolded, as the probe with the sheath thereon is reinserted into the cover, this tab 29 is moved or folded out to a visible position (FIGS. 4 and 5) by engaging a lip 30 of the cover mouth. This provides signalling or indication that the sheath has been used. Preferably the tab 29 includes a brightly colored coating or band 31 (such as bright red) so as to be highly conspicuous and readily noticeable when the tab is unfolded. Inadvertent re-use of the package is, accordingly, substantially precluded. The used package 11 may then be sanitarily discarded when convenient.

Both the sheath 15 and the cover preferably comprise thin, flexible, heat-sealable film material. As will be seen, particularly in FIGS. 2 and 5, sheath 15 comprises a front wall 33 of such material and a back wall 35 thereof heat-sealed together along side edges 37. Slightly thicker, stiffer material is preferably used at the mouth 21 of the sheath to provide a cuff 39 having front and back portions 39a and 39b, respectively. Tab 29 is actually constituted by a portion of cuff portion 39b folded back thereunder along a fold line 41 constituting a lip of the mouth 21.

Cover 17 similarly includes a front wall 43 normally overlying front wall 33 of the sheath and a back wall 45 normally underlying the back wall 35 of the sheath. These front and back walls of the cover are preferably joined together by heat sealing along the side edges 47 and closed end 23 of the cover. Preferably, the sheath front wall 33, back wall 35, and cover front wall 43 are of transparent material, while the back wall 45 as well as cuff 39 are of whitish translucent or opaque material.

Figure 4:
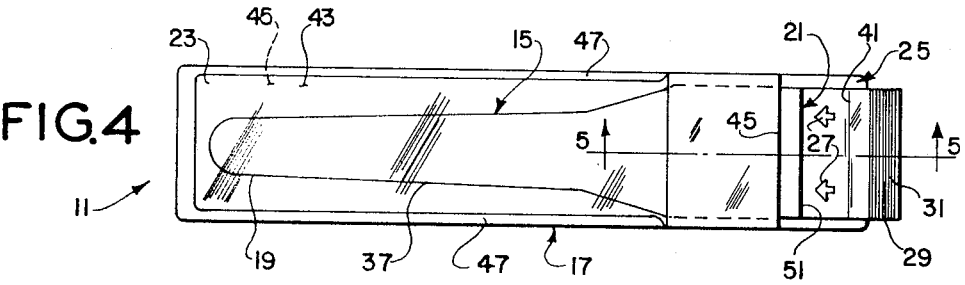
FIG. 4 is a plan view of the package similar to FIG. 1 but after use and reinsertion of the sheath into the cover.
Figure 5:
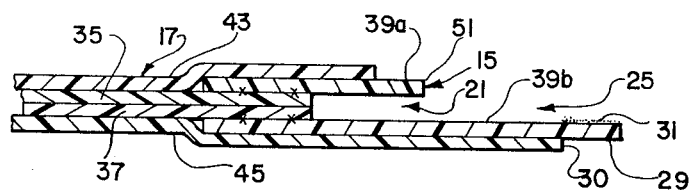
FIG. 5 is a partial cross-section similar to FIG. 2, taken along line 5—5 of FIG. 4, with thicknesses again exaggerated.

In the preferred construction, it is seen that the margin or lip 30 of the back wall 45 of cover 17 at its mouth 25 defines one margin of the package, the margin 49 of the front wall 43 being spaced well inward from the lip 30. The margins or lips 51 and 41 of the sheath front and back walls are spaced between the respective margins or lips 49 and 30 of the cover front and back walls. As is illustrated in FIGS. 4 and 5, tab 29 when unfolded then overlies a portion of the cover back wall 45 at the margin 30 thereof and overlaps the margin 30. Thus, when several of the packages are stacked face-to-face like playing cards, the tab of a used package protrudes conspicuously.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A sheath package for use with an elongate clinical temperature measurement instrument or the like comprising an elongate flexible sheath member having a closed end and a mouth at an opposite end adapted to receive the instrument and an elongate cover member normally substantially enclosing the sheath member, the cover member having a closed end and a mouth at an opposite end, said sheath member extending into the cover member from the mouth of the cover member with the mouth of the sheath member at the mouth of the cover member, whereby the instrument may be inserted in the sheath member while the latter is in the cover member and the instrument, together with the sheath member thereon, may be withdrawn from the cover member through the mouth of the cover member, one of said members including as a part thereof a signal means carried by said one member for movement between a concealed position and a visible position, said signal means normally occupying said concealed position when the sheath member is in the cover member and before the insertion of the instrument in the sheath member and the withdrawal of the instrument with the sheath member thereon, said signal means being movable to said visible position in response to relative movement of the sheath member and cover member whereby when the instrument with the sheath member thereon is reinserted in the cover member the signal means will indicate that the sheath member has been withdrawn from the cover member.

2. A sheath package as set forth in claim 1 wherein the signal means includes a portion which is engageable by the member other than the one which carries the signal means, the signal means being movable by the engagement of said portion thereof to its said visible position in response to reinsertion of the instrument with the sheath member thereon in the cover member, if not previously so moved.

3. A sheath package as set forth in claim 2 wherein said signal means comprises a tab normally folded back within the mouth of the cover member in said concealed position, said tab being unfoldable to said visible position in response to said reinsertion of the instrument.

4. A sheath package as set forth in claim 3 wherein said tab comprises a portion of the sheath member adjacent the mouth of the sheath member, the tab being unfolded by engaging a lip of the cover member mouth in response to said reinsertion of the instrument.

5. A sheath package as set forth in claim 4 wherein said tab is colored to be readily noticeable when unfolded.

6. A sheath package as set forth in claim 4, said sheath member comprising a front wall and a back wall joined together along side edges, said cover member comprising a front wall normally overlying the front wall of the sheath member and a back wall normally underlying the back wall of the sheath member, the front and back walls of the cover member joined together along side edges, said tab comprising a portion of the back wall of the sheath member normally folded back thereunder along a fold line constituting a lip of the mouth of the sheath member.

7. A sheath package as set forth in claim 6, said sheath member including a cuff at the mouth thereof having front and back portions respectively forming portions of the front and back walls of the sheath member, said tab being constituted by a portion of said cuff.

8. A sheath package as set forth in claim 6, wherein the margin of said back wall of the cover at the mouth thereof constitutes one margin of said package, the margin of said front wall of the cover member being spaced inward from said margin of the back wall, the margins of the front and back walls of the sheath member being spaced between the respective margins of the cover front and back walls, said tab when unfolded overlying a portion of the cover member back wall at said margin thereof.

9. A sheath package as set forth in claim 6, wherein the margin of said back wall of the cover member at the mouth thereof constitutes the margin of the package, said tab when unfolded overlapping said margin.

* * * * *